United States Patent
Sercel et al.

(10) Patent No.: US 12,298,042 B2
(45) Date of Patent: May 13, 2025

(54) SYSTEMS AND METHODS FOR MANUFACTURING IN SPACE ENVIRONMENTS

(71) Applicant: Trans Astronautica Corporation, Lake View Terrace, CA (US)

(72) Inventors: Joel C. Sercel, Lake View Terrace, CA (US); Philip J. Wahl, Altadena, CA (US); James G. Small, Sonoita, AZ (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

(21) Appl. No.: 18/687,259

(22) PCT Filed: Aug. 31, 2022

(86) PCT No.: PCT/US2022/075792
§ 371 (c)(1),
(2) Date: Feb. 27, 2024

(87) PCT Pub. No.: WO2023/034883
PCT Pub. Date: Mar. 9, 2023

(65) Prior Publication Data
US 2024/0328674 A1    Oct. 3, 2024

Related U.S. Application Data

(60) Provisional application No. 63/260,913, filed on Sep. 3, 2021.

(51) Int. Cl.
*F24S 40/10* (2018.01)
*B01F 35/71* (2022.01)
(Continued)

(52) U.S. Cl.
CPC .............. *F24S 40/10* (2018.05); *B01F 35/71* (2022.01); *B64G 99/00* (2022.08); *F24S 20/00* (2018.05);
(Continued)

(58) Field of Classification Search
CPC .. F24S 40/10; F24S 50/80; F24S 20/00; F24S 23/00; B01F 35/71; B64G 99/00
(Continued)

(56) References Cited

U.S. PATENT DOCUMENTS 1,964,189 A    6/1934   Koomans
2,930,187 A    3/1960   Chillson
(Continued)

FOREIGN PATENT DOCUMENTS

AU    2007200666 A1    8/2007
CN    103075816        5/2013
(Continued)

OTHER PUBLICATIONS

Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.
(Continued)

*Primary Examiner* — Vivek K Shirsat
(74) *Attorney, Agent, or Firm* — Knobbe, Martens, Olson & Bear, LLP

(57) ABSTRACT

A factory for manufacturing useful products while orbiting is space uses concentrated solar energy, high vacuum, and the low temperatures available in a space environment. Gyroscopic forces from rotating machinery are carefully controlled. Liquids, gases, and solid minerals are separated from asteroid and lunar regolith resources.

22 Claims, 9 Drawing Sheets

(51) Int. Cl.
  *B64G 99/00* (2009.01)
  *F24S 20/00* (2018.01)
  *F24S 20/20* (2018.01)
  *F24S 23/00* (2018.01)
  *F24S 50/80* (2018.01)

(52) U.S. Cl.
  CPC .............. *F24S 20/20* (2018.05); *F24S 23/00* (2018.05); *F24S 50/80* (2018.05)

(58) Field of Classification Search
  USPC .......................................................... 241/65
  See application file for complete search history.

(56) References Cited

U.S. PATENT DOCUMENTS

| | | |
|---|---|---|
| 2,945,234 A | 7/1960 | Driscoll |
| 2,975,592 A | 3/1961 | Fox |
| 2,990,836 A | 7/1961 | Bird |
| 2,991,617 A | 7/1961 | Nerad |
| 3,063,521 A | 11/1962 | Fuller |
| 3,064,418 A | 11/1962 | Sanders |
| 3,202,998 A | 8/1965 | Hoffman |
| 3,564,253 A | 2/1971 | Buckingham |
| 3,597,923 A | 8/1971 | Simon |
| 3,606,211 A | 9/1971 | Roersch et al. |
| 4,013,885 A | 3/1977 | Blitz |
| 4,073,138 A | 2/1978 | Beichel |
| 4,122,239 A | 10/1978 | Riboulet |
| 4,135,489 A | 1/1979 | Jarvinen |
| 4,286,581 A | 1/1981 | Atkinson, Jr. |
| 4,263,895 A | 4/1981 | Colao |
| 4,449,514 A | 5/1984 | Selcuk |
| 4,459,972 A | 7/1984 | Moore |
| 4,480,677 A | 11/1984 | Henson et al. |
| 4,528,978 A | 7/1985 | Robinson |
| 4,564,275 A | 1/1986 | Stone |
| 4,771,599 A | 9/1988 | Brown |
| 4,771,600 A | 9/1988 | Limerick |
| 4,781,018 A | 11/1988 | Shoji |
| 4,815,443 A | 3/1989 | Vrolyk |
| 4,932,910 A | 6/1990 | Hayday |
| 5,014,131 A | 5/1991 | Reed et al. |
| 5,047,654 A | 9/1991 | Newman |
| 5,104,211 A | 5/1992 | Schumacher et al. |
| 5,114,101 A | 5/1992 | Stern et al. |
| 5,138,832 A | 8/1992 | Pande |
| 5,198,607 A | 3/1993 | Livingston |
| 5,202,541 A | 4/1993 | Patterson |
| 5,266,762 A | 11/1993 | Hoffman |
| 5,305,970 A | 4/1994 | Porter et al. |
| 5,459,996 A | 10/1995 | Malloy, III |
| 5,511,748 A | 4/1996 | Scott |
| 5,578,140 A | 11/1996 | Yogev |
| 5,593,549 A | 1/1997 | Stirbl et al. |
| 5,674,794 A | 10/1997 | Chatterjee |
| 5,751,895 A | 5/1998 | Bridges |
| 5,861,947 A | 1/1999 | Neumann |
| 5,979,438 A | 11/1999 | Nakamura |
| 5,982,481 A | 11/1999 | Stone |
| 6,052,987 A | 4/2000 | Dressler |
| 6,057,505 A | 5/2000 | Ortabasi |
| 6,193,193 B1 | 2/2001 | Sorrano |
| 6,290,185 B1 | 9/2001 | DeMars |
| 6,343,464 B1 | 2/2002 | Westerman |
| 6,350,973 B2 | 2/2002 | Wroe |
| 6,532,953 B1 | 3/2003 | Blackmon et al. |
| 6,669,148 B2 | 12/2003 | Anderman et al. |
| 6,742,325 B2 | 6/2004 | Kudija, Jr. |
| 7,207,327 B2 | 4/2007 | Litwin |
| 7,387,279 B2 | 6/2008 | Anderman et al. |
| 7,575,200 B2 | 8/2009 | Behrens et al. |
| 7,594,530 B1 | 9/2009 | Tucker |
| 7,823,837 B2 | 11/2010 | Behrens et al. |
| 7,997,510 B2 | 6/2011 | Pavia et al. |
| 8,033,110 B2 | 10/2011 | Gilon et al. |
| 8,147,076 B2 | 4/2012 | Ezawa |
| 8,357,884 B1 | 1/2013 | Ethridge |
| 8,379,310 B2 | 2/2013 | Mori et al. |
| 9,010,317 B1 | 4/2015 | Gross |
| 9,187,191 B1 | 11/2015 | Jensen et al. |
| 9,222,702 B2 | 12/2015 | Goldberg |
| 9,266,627 B1 | 2/2016 | Anderson |
| 9,346,563 B1 | 5/2016 | Martin |
| 9,409,658 B1 | 8/2016 | Diamandis et al. |
| 9,581,021 B2 | 2/2017 | Ethridge |
| 9,676,499 B2 | 6/2017 | Myers et al. |
| 9,709,771 B2 | 7/2017 | Corrigan |
| 9,771,897 B2 | 9/2017 | Soulier |
| 10,654,596 B1 | 5/2020 | Eller |
| 10,919,227 B2 | 2/2021 | Cook |
| 10,989,443 B1 | 4/2021 | Sercel et al. |
| 11,085,669 B2 | 8/2021 | Sercel |
| 11,143,026 B2 | 10/2021 | Sercel et al. |
| 11,280,194 B2 | 3/2022 | Sercel |
| 11,391,246 B2 | 7/2022 | Sercel et al. |
| 11,566,521 B2 | 1/2023 | Sercel |
| 11,598,581 B2 | 3/2023 | Small |
| 11,608,196 B2 | 3/2023 | Sercel et al. |
| 11,643,930 B2 | 5/2023 | Sercel |
| 11,702,857 B2 | 7/2023 | Sercel |
| 11,725,513 B2 | 8/2023 | Sercel et al. |
| 12,025,006 B2 | 7/2024 | Sercel |
| 12,025,078 B2 | 7/2024 | Sercel |
| 2002/0075579 A1 | 6/2002 | Vasylyev et al. |
| 2002/0184873 A1 | 12/2002 | Dujarric |
| 2003/0029969 A1 | 2/2003 | Turner |
| 2003/0173469 A1 | 9/2003 | Kudija et al. |
| 2003/0224082 A1 | 12/2003 | Akopyan |
| 2004/0004184 A1 | 1/2004 | Schubert |
| 2004/0231716 A1 | 11/2004 | Litwin |
| 2006/0191916 A1 | 8/2006 | Stephan et al. |
| 2007/0128582 A1 | 6/2007 | Anderson et al. |
| 2008/0000232 A1 | 1/2008 | Rogers et al. |
| 2008/0023060 A1 | 1/2008 | Grumazescu |
| 2008/0134667 A1 | 6/2008 | Pavia et al. |
| 2008/0156315 A1 | 7/2008 | Yangpichit |
| 2009/0293448 A1 | 12/2009 | Grote et al. |
| 2010/0038491 A1 | 2/2010 | Cepollina et al. |
| 2010/0163683 A1 | 7/2010 | Quine |
| 2010/0252024 A1 | 10/2010 | Convery |
| 2010/0269817 A1 | 10/2010 | Kelly |
| 2010/0294261 A1 | 11/2010 | Deforge |
| 2010/0319678 A1 | 12/2010 | Maemura et al. |
| 2011/0031238 A1 | 2/2011 | Segawa |
| 2011/0041894 A1 | 2/2011 | Liao |
| 2011/0127382 A1 | 6/2011 | Im |
| 2011/0185728 A1 | 8/2011 | Meyers et al. |
| 2011/0220091 A1 | 9/2011 | Kroyzer |
| 2011/0315678 A1 | 12/2011 | Furuya |
| 2012/0155966 A1 | 6/2012 | Zillmer |
| 2013/0021471 A1 | 1/2013 | Waterhouse |
| 2013/0206209 A1 | 8/2013 | Lasich |
| 2013/0239952 A1 | 9/2013 | Kroyzer |
| 2014/0138952 A1 | 5/2014 | Marumoto |
| 2014/0150651 A1 | 6/2014 | Velasco Valcke |
| 2014/0174430 A1 | 6/2014 | Fitzgerald et al. |
| 2014/0261391 A1* | 9/2014 | Taylor .................... F24S 60/00 126/714 |
| 2014/0262278 A1 | 9/2014 | Walton |
| 2014/0318127 A1 | 10/2014 | Kerns |
| 2015/0027102 A1 | 1/2015 | Bahn et al. |
| 2015/0180114 A1 | 6/2015 | Achour |
| 2016/0010442 A1 | 1/2016 | Kearl |
| 2016/0024921 A1 | 1/2016 | Ethridge |
| 2016/0075453 A1 | 3/2016 | Sauzay et al. |
| 2016/0076792 A1 | 3/2016 | Magaldi |
| 2016/0121395 A1 | 5/2016 | Kawanaka |
| 2017/0129579 A1 | 5/2017 | De Jong |
| 2018/0051914 A1* | 2/2018 | Sercel .................... E21C 51/00 |
| 2018/0194626 A1 | 7/2018 | Berggren et al. |
| 2018/0238272 A1 | 8/2018 | Renaud |
| 2018/0265224 A1 | 9/2018 | Foulds et al. |
| 2019/0271228 A1 | 9/2019 | Sowers, Jr. et al. |

(56) References Cited

U.S. PATENT DOCUMENTS

| | | | |
|---|---|---|---|
| 2019/0358570 | A1* | 11/2019 | Kiefer .................. B01D 53/002 |
| 2020/0055617 | A1* | 2/2020 | Grover .................... G06F 17/13 |
| 2021/0033309 | A1 | 2/2021 | Sercel |
| 2021/0061494 | A1 | 3/2021 | Belieres Montero |
| 2021/0197987 | A1 | 7/2021 | Kokorich et al. |
| 2021/0333019 | A1 | 10/2021 | Sercel et al. |
| 2022/0024612 | A1 | 1/2022 | Sercel et al. |
| 2022/0089302 | A1 | 3/2022 | Sercel et al. |
| 2022/0290635 | A1 | 9/2022 | Sercel |
| 2023/0130545 | A1 | 4/2023 | Sercel |
| 2023/0249848 | A1 | 8/2023 | Sercel |
| 2023/0279776 | A1 | 9/2023 | Sercel |
| 2023/0280098 | A1 | 9/2023 | Small |
| 2023/0383650 | A1 | 11/2023 | Sercel |
| 2023/0399946 | A1 | 12/2023 | Sercel |
| 2024/0159076 | A1 | 5/2024 | Sercel |
| 2024/0254010 | A1* | 8/2024 | Kamen ................... C02F 1/048 |
| 2024/0300677 | A1 | 9/2024 | Sercel |

FOREIGN PATENT DOCUMENTS

| | | |
|---|---|---|
| DE | 10350734 | 3/2005 |
| DE | 102004026517 B3 | 10/2005 |
| EP | 2 177 846 | 4/2010 |
| EP | 2 195 583 | 3/2013 |
| ES | 2639583 | 10/2017 |
| GB | 1481234 | 7/1977 |
| JP | 2012-038954 | 2/2012 |
| JP | 2019-148155 | 9/2019 |
| RU | 2344973 | 1/2009 |
| RU | 2353775 | 4/2009 |
| WO | WO 16/172647 | 10/2016 |

OTHER PUBLICATIONS

Antenna-theory.com, 2015, https://antenna-theory.com/antennas/dipole.php 7/7, The dipole antenna, accessed Aug. 10, 2023.

Antenna-theory.com, 2015, https://www.antenna-theory.com/tutorial/txline/transmissionline.php, Introduction to transmission lines, accessed Aug. 10, 2023.

Arnold, J.R., "Ice in the lunar polar regions", J. Geophys. Res 84., 1979, pp. 5659-5668.

Badescu, V., "Asteroids: Prospective Energy and Material Resources," Jul. 14, 2013, ISBN-13:978-3642392438.

Binzel, R., "Human Spaceflight: Find Asteroids to get to Mars." Nature 514, 559-561, Oct. 29, 2014.

Bliss, T., et al. "Experimental validation of robust resonance entrainment for cpg-controlled tensegrity structures." IEEE Transactions On Control Systems Technology, 2012, vol. 21(3), pp. 666-678.

Bottke, W.F., et al., Debiased orbital and Absolute Magnitude Distribution of the near-Earth objects, Icarus 156, 399-433, 2002.

Bowersox, Kenneth and NASA Advisory Council Committee on Human Exploration and Operations, "NASA Advisory Council Finding on NASA Human Exploration Strategy," from the Council Public Deliberation, Jul. 31, 2014.

Boyle, A., "Blue Origin Space venture slips in a sneak peek at design of Blue Moon lunar lander", Apr. 5, 2017, https://www.geekwire.com/2017/blue-origin-sneak-peek-blue- moon-lunar-lander/.

Boyle, A., "Jeff Bezos lays out his vision for city on the moon, complete with robots", May 20, 2017,https://www.geekwire.com/2017/jeff-bezos-blue-origin-moon/.

Brophy, J., et al, "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.

Brown, P., et al., The Flux of small near-Earth objects colliding with the Earth, Nature 420, 294-296, 2002.

Bussey, D. B. J., et al., "Permanent shadow in simple craters near the lunar poles," Geophysical Research Letters, 2003, vol. 30, No. 6, 1278, pp. 11-1-11-4.

Cassapakis, C.G., et al., "A Power Antenna for Deep Space Missions," Solar Engineering Editors: J.H. Davidson and J. Chavez. Book No. HO1046, 1996.

Ceruti, Conceptual Design and Preliminary Structural Analysis of Inflatable Basket for an Asteroid Capturing Satellite; Strojniški vestnik—Journal of Mechanical Engineering 61(2015)5, 341-351 Received for review: Jul. 17, 2014; © 2015 Journal of Mechanical Engineering; DOI: 10.5545/sv-jme.2014.2063; in 11 pages.

Chen, L.H., et al., Soft spherical tensegrity robot design using rod-centered actuation and control, Journal of Mechanisms and Robotics, 2017, vol. 9(2) pp. 025001.

Chen, M., et al., "Energy analysis of growth adaptable artificial gravity space habitat," AIAA SPACE and Astronautics Forum and Exposition, 2018,in 13 pages.

Cohen, Marc M., et al, "Asteroid Mining," AIAA 2013-5304, presented at AIAA SPACE 2013 Conference and Exposition, Sep. 10-12, 2013, San Diego, CA.

Colaprete, A., et al., "Detection of water in the Icross ejecta plume," Science, vol. 330, pp. 463-468, Oct. 22, 2010.

Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.

Craft, J., et al. "Percussive digging systems for planetary research" IEEE Aerospace and Electronic Systems Magazine, 2010, vol. 25 pp. 21-26.

Crawford, I.A., Lunar resources: A review. Progress in Physical Geography, 39(2): 137-167, 2015.

Crusan, J., "an Evolvable Mars Campaign" NASA Presentation, Jul. 2014, available at https:/www.nasa.gov/sites/default/files/files/20140429-Crusan-Evolvable-Mars-Campaign.pdf.

David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.

Duke, M., et al., "Mining of lunar polar ice", 36th AIAA Aerospace Sciences Meeting and Exhibit, 1998, pp. 1069.

Ehricke, K.A., "The Solar-Powered Space Ship," ARS Paper 310-56, Jun. 1956.

Eldred, et al., "Alternative Scenarios Utilizing Nonterrestrial Resources", Space Resources Scenarios NASA, 1992.

Erickson, K., "Optimal Architecture for an Asteroid Mining Mission: Equipment Details and Integration" Collection of Technical Papers—Space Conference 2006, Sep. 19-21, 2006, San Jose, California; AIAA 2006-7504; in 17 pages.

Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.

Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.

FAA 2012 Commercial Space Transportation Forecasts. Available at http://www.faa.gov/about/office_org/headquarters_offices/ast/media/The_Annual_Compendium_of_Commercial_Space_Transporation_2012.pdf.

Fabbrocino, F., et al., "Optimal prestress design of composite cable-stayed bridges". Composite Structures, 2017, vol. 169, pp. 167-172.

Feldman, W. C., et al., (1998). "Fluxes of fast and epithermal neutrons from Lunar Prospector", Evidence for water ice at the lunar poles, science 281, 1998, pp. 1496-1500.

Fincannon, J., "Lunar Polar Illumination for Power Analysis", NASA/TM, 2008-215446, https://ntrs.nasa.gov/archive/nasa/casi.ntrs.nasa.gov/20080045536.pdf.

Fisher, E.A., et al., "Evidence for surface water ice in the lunar polar regions using reflectance measurements from the Lunar Orbiter

(56) References Cited

OTHER PUBLICATIONS

Laser Altimeter and temperature measurements from the Diviner Lunar Radiometer Experiment", Lunar Polar Volaties, 2018, LBI Contrib. No. 2087.

Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.

Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.

Garenne, A.B., et al, "The Abundance and Stability of Water in Type 1 and 2 Carbonaceous Chondrites," CI, CM, and CRI Geochimica et Cosmochimica Acta 137, 93-112, 2014.

Gertsch, L.S., et al., Laboratory Demonstration and Test of Solar Thermal Asteroid ISRU, funded NASA Early Stage Innovations Space Tech Research Grants, Proposed 2014, funded Jan. 2015.

Gertsch, R.E., et al, "Near Earth Resources," In Near Earth Objects, Annals of the New York Academy of Science, vol. 822, p. 468-510, 1997.

Gertsch, R.E., et al., "Mining near Earth resources," In Near Earth Objects, Annals of the New York Academy of Sciences, vol. 822, p. 511-537, 1997.

Gläser, P., et al., "Illumination conditions at the lunar poles: Implications for future exploration". Planetary and Space Science, in press, 2017, https://doi.org/10.1016/j.pss. 2017.07.006.

Goyal, R., et al., "Analytical study of tensegrity lattices for mass-efficient mechanical energy absorption", International Journal of Space Structures, 2018.

Goyal, R., et al., "Modeling of tensegrity structures", Journal of Open Source Software, 2019, vol. 4(42), pp. 1613.

Goyal, R., et al., "Tensegrity system dynamics with rigid bars and massive strings", Multibody System Dynamics, 2019, vol. 46(3) pp. 203-228.

Granvik et al., Abstract, IAU-Symposium: Complex Planetary Systems, Jul. 7-11, 2014, Namur, Belgium.

Granvik, M., et al., "The population of natural Earth satellites," Icarus, 2012.

Griffin, M.D., et al., "Space Vehicle Design, Second Edition (AIAA Education)", pp. 29-37, Feb. 23, 2004.

GRIP; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; In 10 pages.

Grossman, G., et al, "Inflatable Concentrators for Solar Propulsion and Dynamic Space Power." Journal of Solar Energy Engineering, Nov. 1990, vol. 112/229.

Harwood, William, "NASA's proposed asteroid retrieval mission outlined." Posted in Space Flight Now: Apr. 6, 2013. Available at https://spaceflightnow.com/news/n1304/06asteroid/.

Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.

Hayne, P.O., et al., "Diviner Lunar Radiometer Observations of the LCROSS Impact", Science 330, 2010, pp. 477.

Heiken, G.H., et al., "Lunar sourcebook—a user's guide to the moon". NASA,. Cambridge, England, Cambridge University Press, 1991, vol. 753, pp.

Interbartolo III. Michael A, et al, "Prototype Development of an Integrated Mars Atmosphere and Soil-Processing System", Journal of Aerospace Engineering, Jan. 2013, vol. 26(1), pp. 57-66.

Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.

Lawrence, D. J., et al., "Evidence for water ice near Mercury's north pole from messenger Neutron Spectrometer measurements". Science 339, 2013, pp. 292-296.

Lewis, J.A., "Logistical Implications of Water Extraction from Near-Earth Asteroids," Proceedings of the Eleventh SSI-Princeton Conference, May 12-15, 1993.

Lewis, J.A., "Hard Choices for Manned Spaceflight: America as Icarus", http://csis.org/files/publication/140508_Lewis_HardChoicesMannedSpaceflight_Web.pdf, 2014.

Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).

Li, S. et al., "Possible detection of surface water ice in the lunar polar regions using data from the Moon Mineralogy Mapper (M3)," presented at LPSC XLVIII, Mar. 2017, Houston, TX.

Lunar Exploration Advisory Group "Commercial Lunar Propellant Architecture A Collaborative Study of Lunar Propellant Production", Final Report. Aug. 2018.

Masten, Jun. 17, 2021, Break the ice: Masten designs rocket mining system to extract lunar water, blog, 8 pp.

Mazanek et al., "Asteroid Retrieval Mission Concept—Trailblazing Our Future in Space and Helping to Protect Us from Earth Impactors." Planetary Defense Conference 2013, pp. 3, 5 [online] <URL:http://ntrs.nasa.gov/archive/nasa/casi.ntrs.nasa.gov/20130013170.pdf>.

Mazarico, E., et al., "Illumination Conditions of the Lunar Polar Regions Using LOLA Topography." Icarus, vol. 211, No. 2, 2011, pp. 1066-1081., doi: 10.1016/j.icarus. 2010.10.030.

Mommert, M., et al, "Constraining the Physical Properties of Near-Earth Object 2009 BD," The Astrophysical Journal, vol. 786, No. 2.

Nagase, K., et al., "Minimal mass tensegrity structures", The International Association for Shell and Spatial Structures, 2014, vol. 55(1), pp. 37-48.

NASA Report from Office of the Chief Technologist, Emerging Space: The Evolving Landscape of 21st Century American Space-flight, http://images.spaceref.com/docs/ 2014/Emerging_Space_Report.pdf.

NASA, "Asteroid Redirect Mission Reference Concept," 2013.

Norton, B., "Harnessing Solar Heat," Springer, pages C1-xiii, 39 and 48-73, ISBN 978-007-7275-5, 2013.

Pike R.J., "Crater dimensions from Apollo data and supplemental sources". The Moon, 1976, vol. 15, pp. 463-477.

Pike, R.J., "Depth/diameter relations of fresh lunar craters: Revision from spacecraft data", Geophysical Research Letters, 1974, vol. 1(7), pp. 291-294.

Rapp, D., "Use of Extraterrestrial Resources for Human Space Missions to Moon or Mars (Springer Praxis Books / Astronautical Engineering)" published Nov. 20, 2012.

Reinhold; A Solar Powered Station At A Lunar Pole; Feb. 18, 2021; https://theworld.com/~reinhold/lunarpolar.html; 7 pages.

Rimoli, J.J., et al., "Mechanical response of 3-dimensional tensegrity lattices", Composites Part B: Engineering, 2017, vol. 115, pp. 30-42.

Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.

Rostami, J., et al., "Lunar tunnel boring machines", In Earth and Space 2018: Engineering for Extreme Environments, American Society of Civil Engineers, pp. 240-252, 2018, Reston, VA.

Sabelhaus, A.P., et al. "Model-predictive control of a flexible spine robot", American Control Conference, 2017, IEEE, pp. 5051-5057.

Sanders, Oct. 10, 2019, NASA Lunar ISRU Strategy, presented at the What Next for Space Resource Utilization? Workshop, Luxembourg, 20 pp.

Schlaich, M., "The messeturm in Rostock—A tensegrity tower", Journal of the International Association for Shell and Spatial Structures, 2004, vol. 45(2), pp. 93-98.

Sercel, "Demonstration of "Optical Mining" For Excavation of Asteroids and Production of Mission Consumables." NASA SBIR.

(56) References Cited

OTHER PUBLICATIONS

Apr. 23, 7015 (Apr. 23, 2015), pp. 1-2, [online] <URL:http://sbir.nasa.gov/SBIR/abstracts/15/sbir/phase1/SBIR-15-1-H1 .01-9278.html>.
Sercel, Apr. 22, 2015, Worker Bees: thin-film solar thermal technology enables water-based cis-lunar transportation architecture, ICS Associates Inc., 109 pp.
Sercel, J.C., "Solar Thermal Propulsion for Planetary Spacecraft", presented at the JANNAF Propulsion Conference, San Diego, CA, Apr. 9-12, 1985.
Sercel, J.C., et al., "APIS(Asteroid Provided in-Situ Supplies): 100MT of Water, One Falcon 9 Launch" NIAC Phase 1a proposal submitted Nov. 2014.
Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.
Sercel; Time Dependent Finite Difference Modeling of Outgassing of Asteroids via Bulk Heating; 978-1-5386-2014-4/18/$31.00 © 2018 IEEE; I 14 pages.
Shao, M.B., et al., "Finding very Small Near-Earth Asteroids using Synthetic Tracking," Astrophysics .J 782:1, 2014, arXiv, 1309.3248.
Shapiro, I and the Committee to Review Near-Earth Object Surveys and Hazard Mitigation Strategies. Final Report, National Research Council, National Academies Press, 2010.
Shoji, J. M., et al., "Solar Thermal Propulsion Status and Future", AIAA-92-1719, AIAA Space Programs and Technologies Conference, Mar. 1992.
Skelton, R.E., Tensegrity Systems, 2009, Springer US.
Sowers et al., 2019, Ice mining in lunar permanently shadowed regions, New Space, 7(4):235-244.
Sowers, Jun. 12, 2018, Closing the Business Case for Lunar Propellant, PowerPoint presentation, 13 pp.
Spudis, P., et al., "Evidence for water ice on the moon: Results for anomalous polar craters from the Iro mini-rf imaging radar", Journal of Geophysical Research: Planets, 2013, vol. 118(10), pp. 2016-2029.
Squyres, S. and the NASA Advisory Council, Recommendation Regarding Mismatch Between NASA's Aspirations for Human Space Flight and Its Budget, from the Council Public Deliberation, Jul. 31, 2014.
Staugaitis, C., et al., "Mechanical and Physical Properties of the Echo II Metal-Polymer Laminate (NASA TND-3409)," NASA Goddard Space Flight Center, 1966.
Stoica, A. et al., "TransFormers of Extreme Environments and Their Integration in a Solar Power Infrastructure". AIAA SPACE 2016, AIAA SPACE Forum, 2016.
Stoica, A. et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.
Sultan, C., et al., "Deployment of tensegrity structures", International Journal of Solids and Structures, 2003, vol. 40(18), pp. 4637-4657.
Sunspiral, V., et al., "Tensegrity based probes for planetary exploration: Entry, descent and landing (edl) and surface mobility analysis", International Journal of Planetary Probes, 2013, vol. 7, pp. 13.
Taylor, G.J., "Using the Resources of the Moon to Expand Earth's Economic Sphere." Planetary Science Research Discoveries Report (2019): E205. Nov. 14, 2019 http://www.psrd.hawaii.edu/Nov19/PSRD-lunar-isru.pdf.
Thomas, M. et al., "Scaling Characteristics of Inflatable Paraboloid Concentrators", Presented at the Second ASME-JSES-JSME International Solar Energy Conference, Reno, Nevada, Mar. 17-22, 1991.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Ulas et al., 2013, Numerical analysis of regenerative cooling in liquid propellant rocket engines, Aerospace Science and Technology 24(1):187-197.
Vasavada, A. R., et al., "Near-Surface Temperatures on Mercury and the Moon and the Stability of Polar Ice Deposits". Icarus, 1999, vol. 141, pp. 179-193.
Wihite, Alan, et al., Evolved Human Space Exploration Architecture Using Commercial Launch/Propellant Depots, 63rd International Astronautical Congress, Naples, Italy, 2012.
Yildiz, K., et al, "Effective beam stiffness properties of n-strut cylindrical tensegrity towers", AIAA Journal,2019, vol. 57(5), pp. 2185-2194.
Yildiz, K., et al., "A novel deployment strategy for tensegrity towers", AIAA Spacecraft Structures Conference, 2018, pp. 0693.
Zacny; Asteroid Mining; AIAA SPACE 2013 Conference and Exposition Sep. 10-12, 2013, San Diego, CA; AIAA 2013-5304; in 16 pages.
Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.
International Search Report and Written Opinion dated Nov. 23, 2022 in application No. PCT/US22/75792.
Bradford et al., Jul. 9, 2001, Fresnel concentrators for space solar power and solar thermal propulsion: final report, United Applied Technologies, Inc., 22 pp.
Stewart et al., Sep. 1996, Dual fuel solar thermal stage—ideal analysis, Journal of Spacecraft and Rockets, 33(5):752-754.

\* cited by examiner

SYSTEMS AND METHODS FOR MANUFACTURING IN SPACE ENVIRONMENTS

INCORPORATION BY REFERENCE TO ANY PRIORITY APPLICATIONS

This application is a U.S. national phase application under 35 U.S.C. § 371 of International Application No. PCT/US2022/075792, filed Aug. 31, 2022, which is based upon and claims the benefit of priority from U.S. Provisional Patent Application No. 63/260,913 filed on Sep. 3, 2021. Moreover, any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

Field

Materials and structural members for constructing large orbiting space platforms can be fabricated on orbit. Feedstock materials can be processed from asteroid and lunar regolith sources. Solar energy, hard vacuum, and low temperature of deep space can be used in manufacturing processes.

SUMMARY

It is desirable to construct large structures in near-earth space by using readily available energy and materials that can be found in space. Previously, all man-made space structures have been assembled on Earth and boosted to earth orbit by means of large rockets. It is costly to bring finished structures up from the gravity well of Earth. Space-based manufacturing on an industrial scale can dramatically lower costs for large space structures.

Methods of space manufacturing differ substantially from earth-based methods. Furthermore, finished products when manufactured in space are not required to survive the harsh conditions during transport by earth-launched rockets. There are no requirements that products be folded or compactly arranged to fit inside the confines of a missile nose cone. Space manufactured products do not need to unfold or be assembled after separation from a booster rocket. They do not need to survive the large launch accelerations and vibrations required of ground launched products. Space manufactured products may be optimized to function in an environment of low mechanical stresses. Therefore, space manufactured products may be much larger or may incorporate much less mass than equivalent products launched from earth.

To capture the economic benefits of space-based manufacturing, it is desirable to make use of resources abundantly available in space. These can include: continuous uninterrupted solar energy, the intense cold of deep space, hard vacuum, microgravity and abundant small asteroids which frequently pass near the Earth. The raw material for most space manufacturing can come from the large variety of minerals, metals and volatile fluids found in asteroids. Additional sources are materials found on or near the surface of the Moon and other low gravity bodies.

The manufacturing process begins by separating and refining the purity of these materials into feedstocks suitable for subsequent fabrication steps. Multiple systems and methods may be employed that have little in common with earth-based manufacturing.

One aspect is an orbiting factory in space, comprising: a containment vessel configured to contain feedstock material obtained from an asteroid or lunar regolith; and one or more optical components configured to collect solar energy from the Sun, concentrate the collected solar energy, and direct the concentrated solar energy to impinge upon a surface of the feedstock materials.

In some embodiments, the orbiting factory further comprises: a structural frame, wherein the one or more optical components comprise one or more collection mirrors rigidly affixed to the structural frame.

In some embodiments, the orbiting factory further comprises: one or more counter-rotating structures configured to maneuver the orbiting factory so as to keep the one or more collection mirrors pointed at the distant Sun.

In some embodiments, the orbiting factory further comprises: an adjustable shutter configured to control an intensity of concentrated solar energy via partially or completely blocking an optical path of the concentrated solar energy.

In some embodiments, the orbiting factory further comprises: a plurality of rotating structures configured to be oriented with axes of rotation that are aligned perpendicularly to an orbital plane of the orbiting factory.

In some embodiments, the one or more optical components are further configured to direct the concentrated solar energy to pass across a physical vacuum gap before entering the containment vessel.

In some embodiments, the one or more optical components are further configured to concentrate the solar energy to a power level sufficient to evaporate volatile gases and to cause spalling and fracturing of the feedstock material.

In some embodiments, the orbiting factory further comprises: a plurality of condensation chambers configured to receive the evaporated gasses, the condensation chambers further configured to rotate around an axis of rotation.

In some embodiments, two or more of the condensation chambers are interconnected and are controlled to maintain differing temperatures in order to separate solid, gaseous, and liquid fractions, at least some of the fractions being collect in different condensation vessels.

In some embodiments, each of the condensation chambers comprises a plurality of internal metal plates spaced apart to increase surface area available within the condensation chambers for condensation of liquid fractions.

In some embodiments, a fraction of the spalled feedstock materials includes unconsolidated solid particles which are ground into a powder, the orbiting factory further comprising: a shaped container configured to compact the powder and sinter the compacted powder into shaped ceramics.

In some embodiments, the one or more optical components are further configured to direct the concentrated solar energy to heat the powder to a defined range of temperatures in a preplanned and time-controlled sequence, and wherein the one or more optical components comprise an adjustable shutter in an optical path of the concentrated solar energy configured to control the heating of the powders, the orbiting factory further comprising: a vice configured to apply a uniaxial pressure to the powder in the shaped container.

In some embodiments, the shaped ceramics comprise tile-shaped ceramics configured to be employed as sacrificial heat shields for reentry vehicles.

In some embodiments, the shaped ceramics comprise block-shaped ceramics configured to be employed in constructing protective radiation shields for human habitats.

In some embodiments, a fraction of the spalled feedstock materials includes unconsolidated solid particles, the orbiting factory further comprising: a refractory container configured to receive the solid particles in a vacuum environment, wherein the one or more optical components are further configured to direct the concentrated solar energy to head the refractory container to a temperature sufficient to melt the solid particles; and a piston configured to apply a pressure to the melt to extrude the melt through a shaped orifice in the refractory container.

In some embodiments, the orifice is shaped to produce extrusions of useful engineering shapes including one or more of: round rods, flat sided rods of three or more sides, I-beams, T-beams, U-channels, and rods with curved cross sections.

In some embodiments, the orbiting factory further comprises: one or more chambers configured to anneal the extrusions for a period of time by holding the extrusions at temperatures below the melting and softening temperature of the extrusions in order to reduce brittleness.

In some embodiments, the orifice comprises one or more orifices, each having a diameter of less than 1 millimeter configured to produce one or more small diameter extrusions.

In some embodiments, the orbiting factory further comprises: a rotating heated drum configured to collect the one or more extrusions, wherein the drum is configured to be heated to a temperature sufficient to anneal the extrusions over a period of time, thereby reducing the brittleness and increasing the flexibility of the extrusions.

In some embodiments, the drum is further configured to rotate at a speed controlled to stretch the extrusions into smaller diameter fibers before the fibers are collected on the rotating drum.

In some embodiments, the fibers are configured to be removed from the drum, twisted together in a textile spinning method, and further combined into larger cords or cables or nets or fabrics.

In some embodiments, the orbiting factory further comprises: a crucible configured to hold processed feedstock; a form enclosing the crucible and having a shape of a structure to be fabricated.

In some embodiments, the one or more optical components are further configured to direct the concentrated solar energy to the processed feedstock to vaporize the processed feedstock.

In some embodiments, the crucible comprise pores dimensioned to allow the vaporized feedstock to pass through the pores and deposit onto walls of the form.

DETAILED DESCRIPTION

Figure 1:
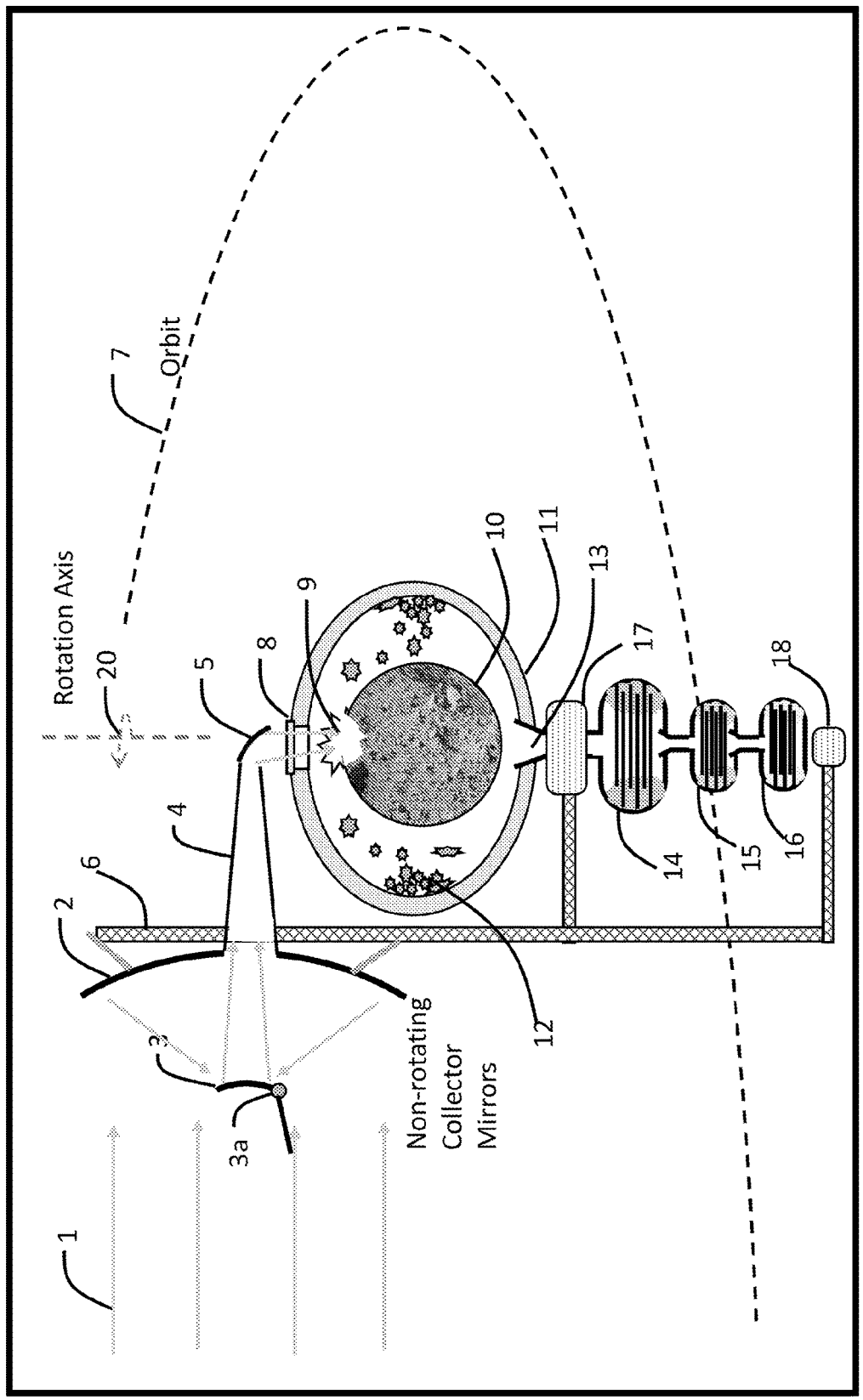
FIG. 1 is a schematic representation of concentrated solar energy acting on a captured asteroid or lunar regolith.

The present systems and methods are now described in detail with reference to the drawings. Like reference numerals are generally used to refer to like elements.

Aspects of this disclosure relate to systems and techniques for extracting raw materials and fabricating the extracted materials into useful components. In particular, aspects of this disclosure relate to systems designed for the space environment which can use raw solar thermal power as an energy source. Further aspects of this disclosure incorporate thin-film inflatable solar reflectors, thin-film, and/or foil inflatable forms in the shape of the structures to be fabricated, imaging and non-imaging optics, and/or high temperature crucibles.

Aspects of this disclosure relate to techniques for building a solar thermal powered factory in space to turn asteroids and lunar materials into massive space settlements, enabling millions of people to live and work in space. In particular, aspects of this disclosure solve certain challenges to large scale human settlements and industrialization of space.
Preparing Raw Materials.

FIG. 1 illustrates a space factory that can concentrate solar energy onto a captured asteroid or lunar regolith for use in space manufacturing in accordance with aspects of this disclosure. The space factory includes a mirror 2, a secondary mirror 3, an adjustable shutter 3a, a light conduit 4, an additional mirror 5, a structure 6 (also referred to as a structural frame), a transparent pressure-tight window 8, raw material 10, a containment vessel 11, one or more pipes 13, a plurality of condensation chambers 14, 15, and 16, and one or more electric motors 17 and 18. In some implementations, a space factory may include a plurality of the structures illustrated in FIG. 1 such that the processing of multiple raw materials can be performed in parallel.

In some embodiments, the mirrors 2, 3, and 5, the adjustable shutter 3a, and the light conduit 4 can form a solar energy collection and concentration system. Aspects of this disclosure are not limited to the particular embodiments of solar collection and concentration systems illustrated in the figures. For example, other optical components (e.g., lenses, reflective materials, prims, etc.) can be used to collect and concentrate solar energy for use in processing and manufacturing materials.

Referring to FIG. 1, one step in space manufacturing is to process raw materials into useful feedstocks. Incoming solar energy 1 from the Sun is collected and focused (e.g., by the large, curved mirror 2). The mirror 2 may not be drawn to scale. The mirror 2 and similar collecting mirrors throughout the factory can be sized to collect sufficient energy for their intended processes. For example, if the mirror 2 is circular and 35 meters in diameter, it will collect approximately 1 MW of continuous solar-thermal power when the factory is orbiting at Earth's distance from the sun. At the orbit of Mars, the same mirror 2 would collect about ¼ as much thermal power.

In certain implementations, the mirror 2 is pointed directly at the distant Sun and does not rotate independently of the space factory structure 6. The mirror 2 can be attached (e.g., rigidly attached) to the structure 6 of the space factory. The entire space factory can slowly rotate as it moves along its orbit 7 around the Earth or around the Sun in order to keep the space factory's multiple collector mirrors 2 pointed directly toward the Sun.

Referring again to the example system of FIG. 1, the incoming solar energy 1 is collected by the mirror 2 and focused toward the secondary mirror 3. In some embodiments, the mirror 2 and/or the secondary mirror 3 may include thin-film inflatable solar concentrators, thin-films, or foil inflatable forms. Attached to the secondary mirror 3 is an adjustable shutter 3a. It can partially or completely block the secondary mirror 3 to provide control of the total solar energy input to the space factory, and it can have shape that complements or otherwise corresponds to the curvature of the secondary mirror 3. The secondary mirror 3 further focuses the incoming energy and directs the solar energy toward a destination and/or other optical elements. For example, it can direct energy into an enclosed light conduit 4. At the end of the light conduit 4, a final mirror 5 can turn the light beam at approximately 90 degrees from the direction to the Sun. However, this is merely one embodiment. Thus, alternative solar energy collection and direction systems are contemplated. For example, the mirror 5 can redirect the light beam at different angles or the mirror 5 can be removed from the factory in embodiments where redirection of the light beam is not required. Solar energy converging from the mirror 5 passes through the transparent pressure-tight window 8 into the containment vessel 11. The solar energy finally converges in a highly concentrated spot 9 on the surface of the raw material 10 which may have come from an asteroid or from regolith on the surface of the moon.

When solar energy is concentrated as described herein, the solar energy can heat the surface of solid materials to temperatures which exceed the melting point of most known materials, for example to temperatures higher than 2500 C. At or below such temperatures, any volatile components within the raw material 10, such as water or entrained gases such as methane or $CO_2$ will be rapidly boiled out of the raw material 10 and turned to vapor, thereby causing a rise of gas pressure in containment vessel 11.

When intense heat is applied in a localized spot (e.g., the concentrated spot 9) to the surface of a heterogeneous solid material such as rocky asteroids or regolith, a strong thermal gradient is formed as the temperature varies greatly between a spot 9 and other portions of the solid material. The diverse minerals contained within the matrix forming that heterogenous material expand at different rates. The result is the raw material 10 can crack and spall into numerous smaller pieces 12. For example, sufficiently intense light can drill holes in concrete.

As a result of this process, the unconsolidated spalled pieces 12 are typically thoroughly degassed. The spalled pieces 12 can be collected and used in further processing steps described below. Any remaining large pieces may be subsequently crushed by mechanical or electrical processes into additional unconsolidated smaller pieces. For purposes of this discussion, all such unconsolidated small pieces will be collectively referred to as "unconsolidated feedstock".

In some embodiments, a physical gap is provided between the mirror 5 and the window 8. The containment vessel 11 is thus free to rotate independently of the mirrors 2, 3, and 5, the light conduit 4, and of the space factory structure 6. By slowly rotating the containment vessel 11, centrifugal forces can be used to collect and concentrate the spalled pieces 12 against the inner surface near the rotational equator of containment vessel 11. Despite the gap, alignment between the mirror 5 and the window 8 can be maintained by other supporting structures (e.g., such as the space factory structure 6). Freedom of rotation can also facilitate persistent (or opportunistic) alignment of solar collection components (e.g., collector mirrors 2) with incoming solar energy, even while a factory or related vessels are rotated. In some embodiments, a solar energy beam can be turned on using alignment or turned off using misalignment or deployment of a shutter.

The pressurizing volatile gases can be allowed to pass out of the containment vessel 11. Using a pressure gradient, the gases can be passed through pipes 13 and then through a series of condensation chambers 14, 15, and 16, or as many chambers as may be needed. The condensation chambers 14-16 can be maintained at successively lower temperatures to separately condense the various volatile products. The condensation chambers 14-16 may rotate like (e.g., at the same rate as) the collection chamber 11.

Controlling Unwanted Gyroscopic Forces.

It is desirable to carefully control the angular momentum of all rotating structures within a space factory. The rotation rates of internal structures in the example of FIG. 1 can be controlled by electric motors 17 and/or 18 (or similar additional motors) that can be rigidly connected to the space factory structure 6.

The rotating structures may have masses exceeding hundreds of metric tons. In the embodiment of FIG. 1, the directional axis of rotation 20 is shown by a vertical broken line and broken curved arrow. In some implementations, all rotating structures within the factory can be designed to have their rotation axes 20 perpendicular to the plane of orbit 7. It is equivalent to state that the rotation axes 20 of structures within the factory are designed to be parallel to the rotation axis of the orbit 7. Changes in angular momentum of the factory structures along the rotation axis 20 can cause the space factory to re-orient (e.g., slowly turn left or right away from pointing directly at the Sun, which can be always in the plane of the orbit 7). The space factory can further include one or more counter-rotating structures used to correct pointing drift by adjusting the rotation rate of the one or more counter-rotating structures. When the total angular momentum is properly adjusted the space factory can turn slowly and always point directly at the Sun as the space factory follows its orbit 7 without requiring further mechanical input energy. The individual rotating structures (which can weigh multiple tons, when on earth) can nevertheless, when in space, rest gently in their motor bearings with minimal forces and minimal wear to the bearings.

Conversely, it is undesirable to point the axis of rotation in other directions, for example along or partially along the direction toward the Sun. In those cases, gyroscopic forces due to the curvature of the orbit 7 can cause the individual rotating structures to precess and twist against their motor bearings and connected piping. For rotating structures with masses of hundreds of metric tons, the undesirable gyroscopic precession forces may become dangerously large and could lead to catastrophic damage. Precession forces can furthermore cause the entire space factory to turn away from the Sun in up and down directions (above or below the plane of the orbit 7). Such undesirable motions can be corrected by adding additional rotating structures along additional axes of rotation. Other emergency orientation rockets or other maneuvering and orienting devices can be added for safety and to provide additional options in case of unforeseen events like meteor strikes, sabotage by hostile actors, or space junk encounters.

Fractional Distillation.

Figure 2:
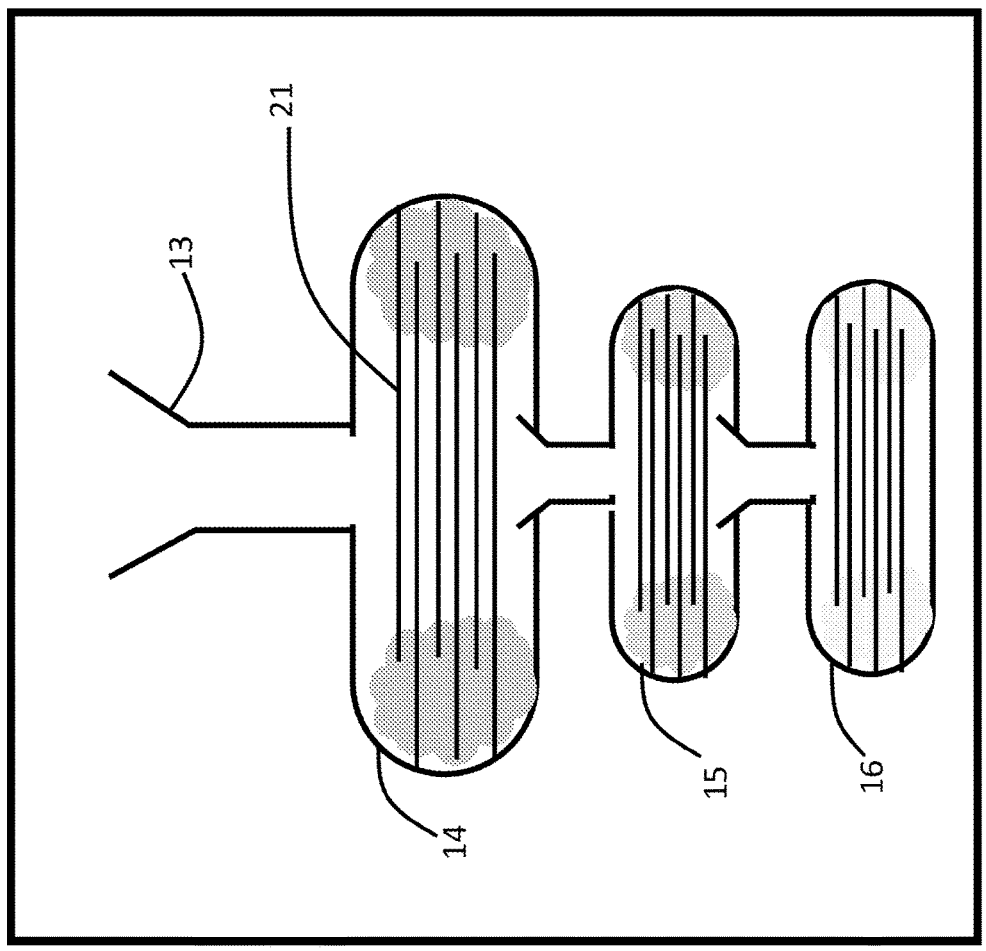
FIG. 2 illustrates details of a fractional distillation method operating in micro gravity.

FIG. 2 shows an expanded view of the condensing chambers 14, 15, and 16. Certain methods of using a series of condensing chambers at progressively decreasing temperature can also be used in terrestrial applications and can be described as "fractional distillation".

According to aspects of this disclosure, each of the chambers 14-16 encloses an alternating interleaved stack of metal plates 21. The plates 21 can be cooled by being in thermal contact with walls of the temperature-controlled chamber 14-16. For terrestrial industrial applications such as crude oil processing, the condensed fluid may be caused to flow by gravity across and around multiple stacked plates contained in tall vertical fractional distillation columns. For space applications (e.g., in micro gravity environments), centrifugal forces and temperature gradients can be substituted for the lack of gravity.

The plates 21 provide a large surface area on which vapors can condense. Rotation of the chambers 14-16 causes the condensed liquids to flow toward the walls of chambers 14-16 by centrifugal force. By this method, the central area of the plates 21 near the rotation axis is continually cleared of standing condensed fluid. The process of condensing additional vapor is beneficially enhanced on the plates 21 with thin or no standing fluid films.

Fabricating Engineered Materials from Asteroid and Lunar Regolith Feedstocks.

For economy of words in the following discussion, the phrase "asteroid and lunar regolith feedstock" will be replaced by the phrase "asteroid feedstock". Unless otherwise clear from the context, the larger meaning is always intended when using the phrase "asteroid feedstock."

For the present discussion, the term "low-performance engineered material" refers to a large class of terrestrially manufactured products which are derived from commonly available resources and processed with commonly available tools and heating and cooling methods. Some examples include: adobe bricks, terra cotta ceramics, asphalt and gravel pavements, and soda-lime-silica glass. They may actually perform at a high level in certain environments.

"High-performance engineered materials" generally require high-purity feed stocks, many processing steps, and combinations of dissimilar materials. Examples include: stainless steel alloys, graded-index glass fibers for communication cables, photovoltaic and other semiconductor materials, and steel-reinforced concrete.

Both high-performance and low-performance engineered materials may be fabricated in the space-based orbiting factories described herein. While it may be possible to simply reproduce terrestrial methods in a space factory, there are certain abundant resources available in space that are difficult to obtain on Earth. These resources include: almost unlimited solar energy, hard vacuum, cryogenic temperatures of the surrounding deep space, etc. Space resources may be used to advantageously fabricate products by methods that would be impractical on Earth.

Figure 3:
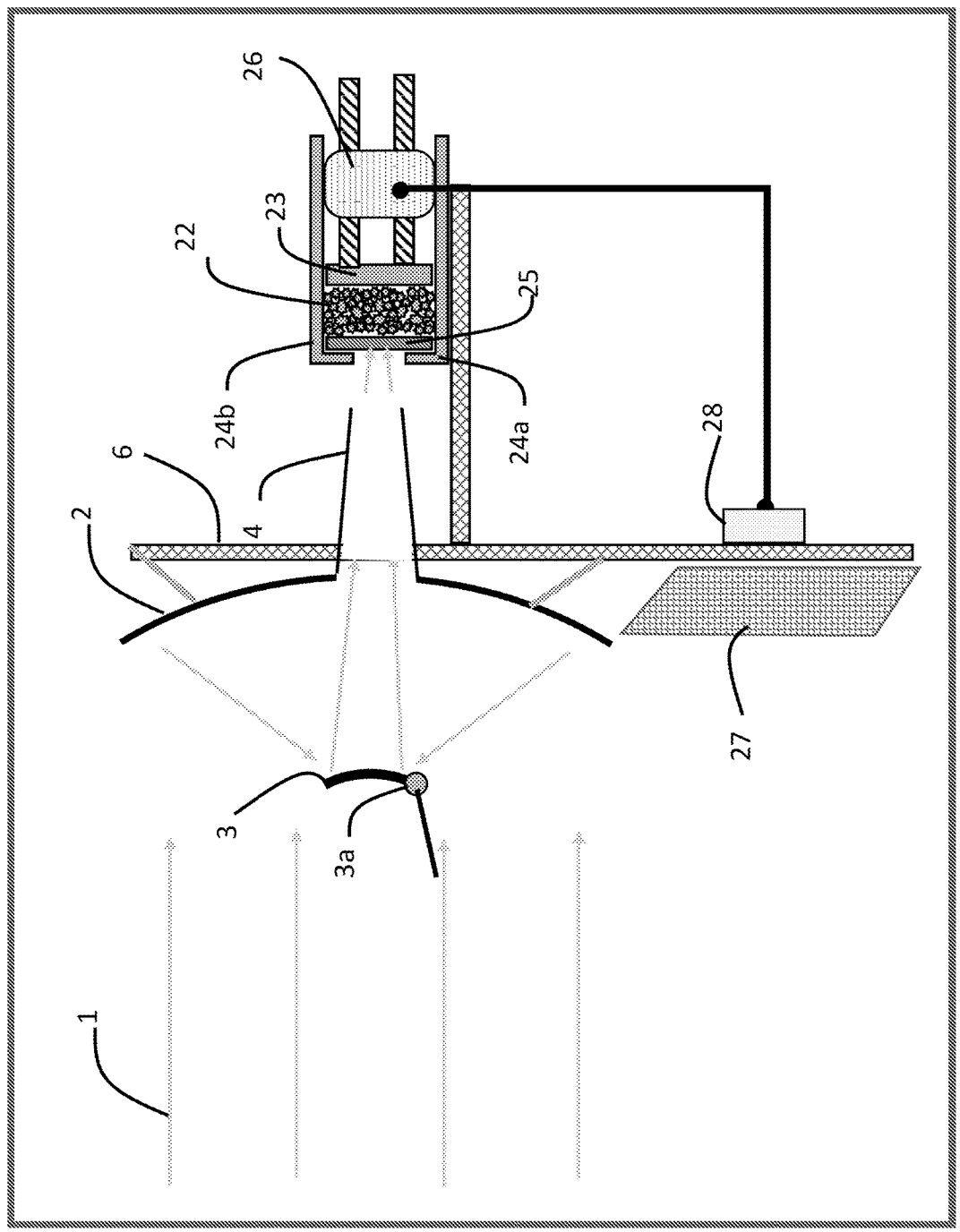
FIG. 3 illustrates the fabrication of ceramic tiles and blocks by sintering.

FIG. 3 illustrates a system for the fabrication of ceramic tiles and blocks by sintering in accordance with aspects of this disclosure. The system includes a mirror 2, a secondary mirror 3, an adjustable shutter 3a, a light conduit 4, a structure 6, jaws 23, 24a, and 24b, an electrically powered vice 26 including a heated pusher plate 25, a photoelectric solar panel 27, and an electrical controller 28.

Referring to FIG. 3, low-performance ceramic tiles and blocks can be fabricated by sintering. Spalled pieces 12 of asteroid feedstock from FIG. 1 (also termed unconsolidated feedstock) can be ground to a fine powder 22. The loose powder 22 can fill a shaped volume between the jaws 23, 24a, and 24b and heated by the pusher plate 25 of the electrically powered vice 26. The pusher plate 25 can be heated by concentrated solar energy in a method similar to that described in connection with FIG. 1. The powder 22 and all other mechanical components may be exposed to the vacuum of orbital space.

The vice 26 can apply a uniaxial compression to the powder 22 while heated with concentrated solar energy. The concentrated solar energy entering through enclosed light conduit 4 impinges on the heated pusher plate 25, heating the pusher plate 25 in a predetermined temperature cycle suitable for sintering the loose powder 22. The maximum heating temperature depends on the properties of the powder 22 but is typically near 800 C.

Heating can be controlled. Control methods include changing an impingement angle, reconfiguring optical elements, etc. For example, adjustment of the intensity of incoming solar energy 1 can be accomplished using the adjustable shutter 3a. The electrically powered vice 26 can be energized by the photoelectric solar panel 27 acting through the electrical controller 28. For simplicity, various temperature sensors and computer control methods are not shown. This vacuum sintering process would be difficult to reproduce on Earth. It is a convenient process in a space-based factory.

There are many desirable applications for sintered ceramic tiles and blocks in space constructions. For example, tiles may be used as sacrificial heat shields for reentry vehicles. Shaped blocks may be used to construct protective radiation shields for human habitats. It would be undesirably expensive to launch these relative massive and low performance products from Earth. Fabrication from asteroid feedstocks in orbiting factories can have good economic value.

Fabrication of Low-Performance Engineered Structural Elements

Figure 4:
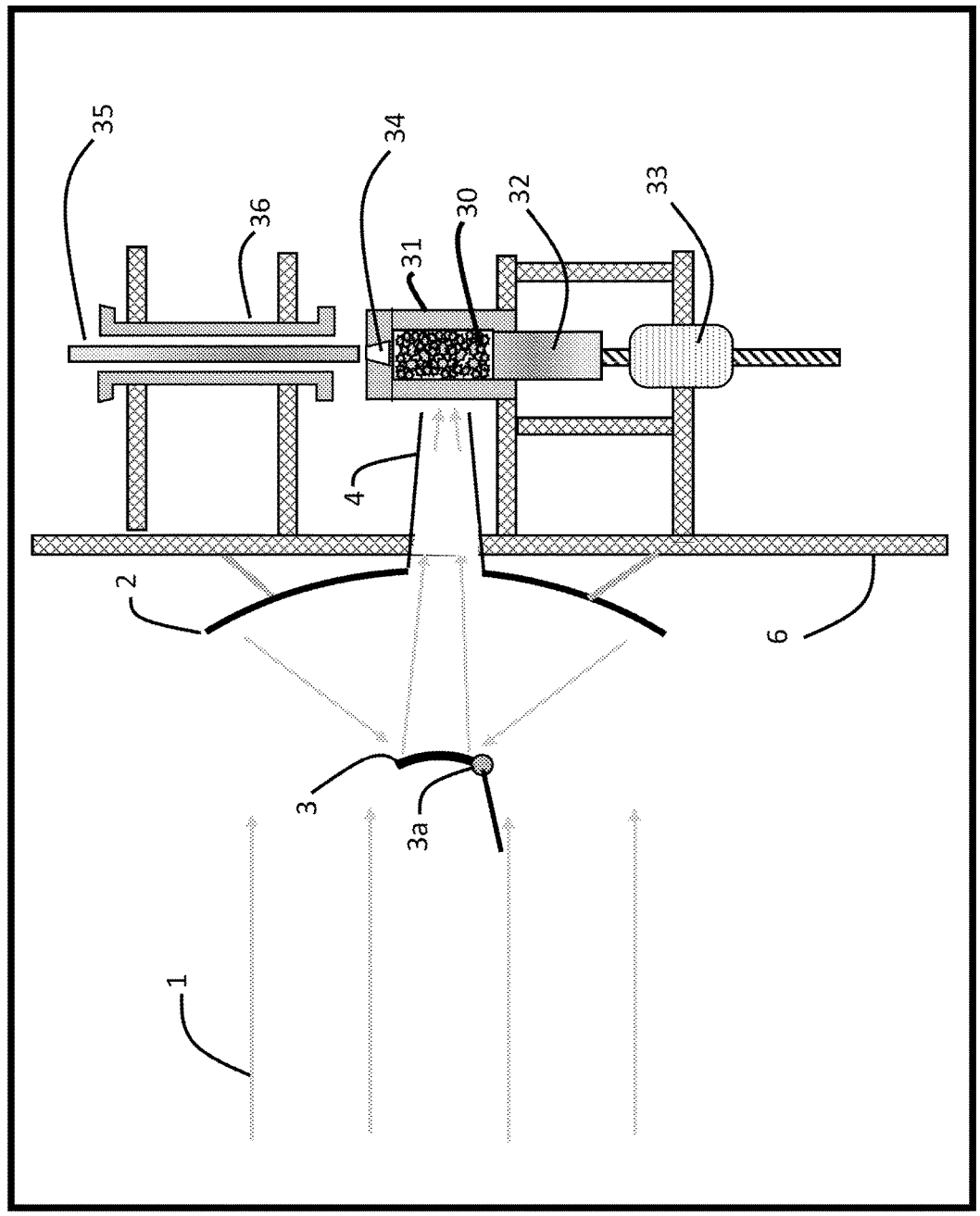
FIG. 4 illustrates the fabrication of structural rods and channel beams by melt extrusion.

FIG. 4 illustrates a system for fabricating structural rods and channel beams by melt extrusion in accordance with aspects of this disclosure. The system includes a mirror 2, a secondary mirror 3, an adjustable shutter 3a, a light conduit 4, a structure 6, a hollow cylinder 31, a piston 32, an electric motor 33, a shaped exit orifice 34, and one or more guides 36.

In particular, FIG. 4 illustrates the fabrication of low-performance structural rods and channel beams by melt extrusion. Unconsolidated asteroid feedstock 30 can be placed into the hollow cylinder 31 to fill the internal space of the cylinder 31. Concentrated solar energy entering through the enclosed light conduit 4 impinges on the cylinder 31 heating the cylinder 31 to a temperature sufficient to melt the feedstock 30 into a viscous liquid similar to molten volcanic lava. The temperature required to melt the feedstock is much higher than the temperature required for sintering. The melting temperature may be as high as 1800 C or higher. This temperature and substantially higher are well within the capability of concentrated solar energy.

As the feedstock 30 melts, the feedstock 30 may consolidate into a smaller volume. In a microgravity environment, liquids in an oversized container tend to float around as small globules. The piston 32 can be continually advanced by the electric motor 33 to maintain a moderate pressure on the feedstock 30 and keep the feedstock 30 consolidated during the melting process. In vacuum heating, there is no air in the unconsolidated feedstock 30 and therefore no bubbles will be captured in the melt.

When melting is complete, the piston 32 is advanced with a higher pressure to force the melt through the shaped exit orifice 34. The extruded shape 35 slowly cools and hardens into a glass-like material. The guides 36, which may be optional thermally insulated, constrain the cooling shape from bending. The guides 36 can further assure that the cooling is not too rapid. Solidifying glass objects may generally benefit from a period of annealing at an intermediate temperature before final cooling to reduce brittleness.

Low performance structural rods and channel beams made by this process may not have the strength of similar shapes fabricated from high performance alloy metals. However, low performance shapes are often completely adequate for large space-based construction projects due to the minimal forces acting upon orbiting structures. Low performance shapes have desirable economic value in space construction.

Fabrication of Low Performance Fibers

Figure 5:
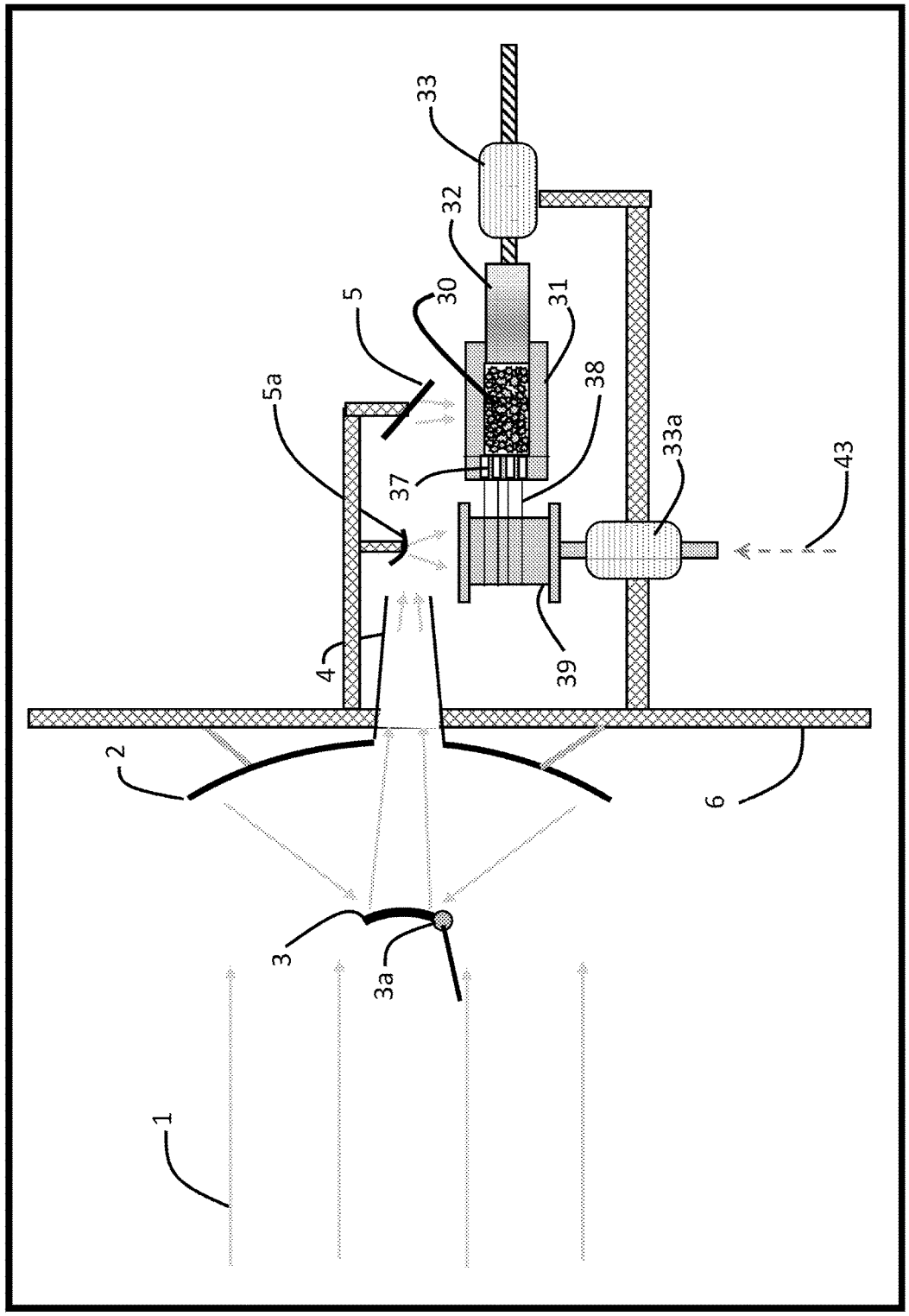
FIG. 5 illustrates the fabrication of mineral fibers used in fabrics and tension cables.

FIG. 5 illustrates a system for fabricating fine fibers 38 by melt extrusion in accordance with aspects of this disclosure. The system includes a mirror 2, a secondary mirror 3, an adjustable shutter 3a, a light conduit 4, additional mirrors 5 and 5a, a structure 6, a hollow cylinder 31, a piston 32, electric motors 33 and 33a, one or more openings 37, and a rotating drum 39.

FIG. 5 illustrates a melt-extruding mechanism similar to the system of FIG. 4, which has been rotated 90 degrees. The unconsolidated asteroid feedstock 30 can fill the internal space of the hollow cylinder 31. Concentrated solar energy entering through the enclosed light conduit 4 and reflected by the mirror 5 impinges on the cylinder 31 heating the cylinder to a temperature sufficient to melt the feedstock 30 into a viscous liquid.

In this embodiment, the exit orifice includes one or more small diameter openings 37. For example, in certain implementations the diameters of the openings may be one tenth millimeter. The motor 33 produces linear motion to advance the piston 32. Melt is extruded through the orifice into one or more fine fibers 38. The fibers 38 are immediately collected on the rotating drum 39. The drum 39 is rotated relatively slowly by the motor 33a. The rotating motion of the motor 33a serves to pull and stretch the fibers 38. The rotation speed is adjusted to maintain a uniform fiber diameter. Similar to other rotating machinery in the space factory, the rotation axis 43 can be carefully directed to be perpendicular to the plane of orbit 7 shown in FIG. 1.

The drum 39 can serve as temporary warm storage for the fibers 38. The drum 39 can be warmed to a suitable annealing temperature by solar energy reflected from the mirror 5a. Specific annealing temperatures can depend on the detailed composition of the asteroid feedstock, but typically lie in a range of temperatures around 400 C. The annealing temperature is much lower than the temperature required to melt the feedstock. Therefore, the mirror 5a may typically be much smaller than the mirror 5.

Extruded fibers made by the system of FIG. 5 may not be as strong and flexible as fibers fabricated from purified glass melts. Nevertheless, they may be sufficiently strong to twist into threads and cables for structural purposes or to be woven into nets and fabrics.

Vacuum Smelting of Asteroid Ores

Figure 6:
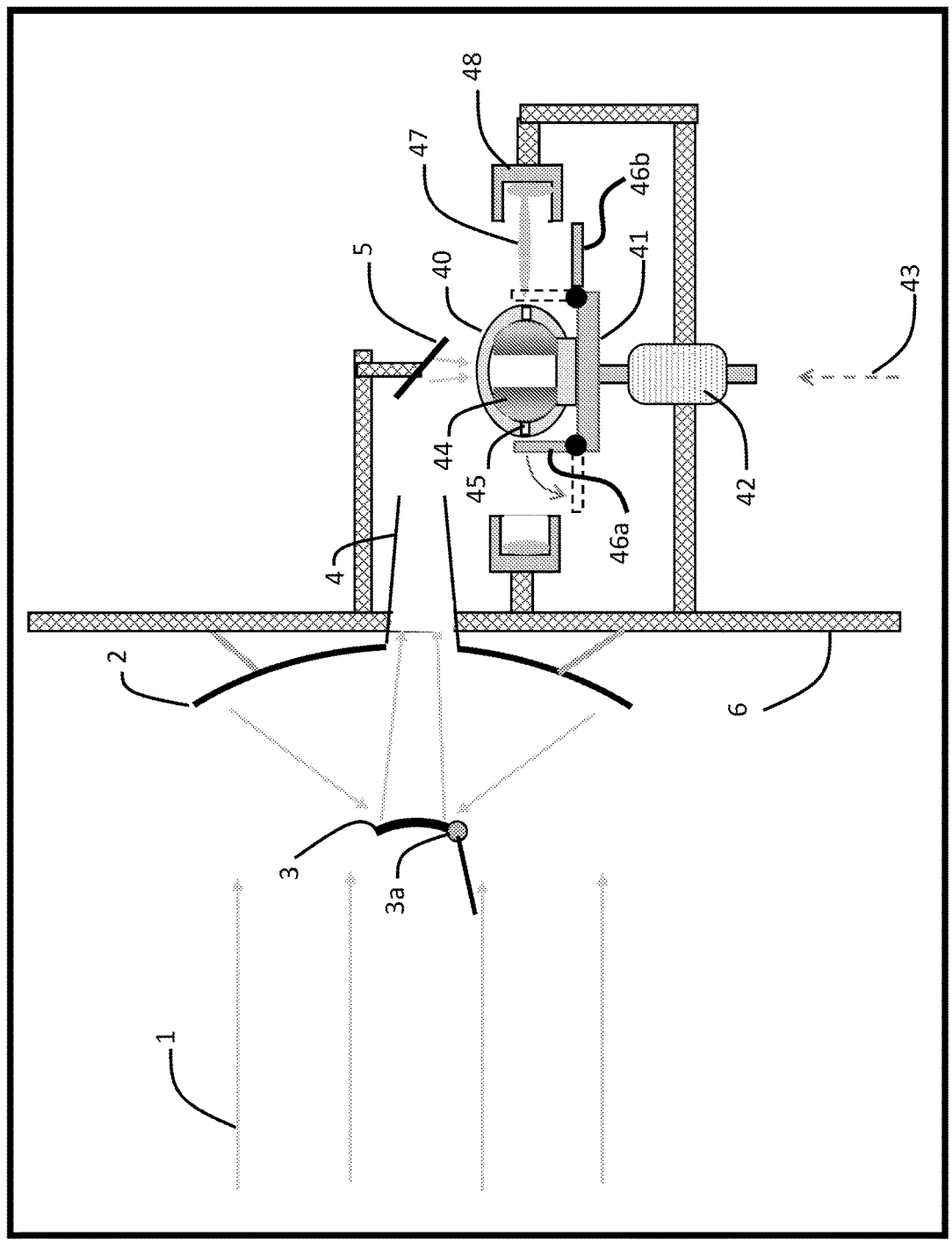
FIG. 6 illustrates smelting of metal-bearing asteroid ores in a microgravity factory.

FIG. 6 illustrates a system for separating metals in accordance with aspects of this disclosure. The system includes a mirror 2, a secondary mirror 3, an adjustable shutter 3a, a light conduit 4, an additional mirror 5, a structure 6, a smelting vessel 40, a spinning platform 41, a motor 42, a plurality of drainage passages 45, a plurality of hinged stopper plates 46a and 46b, and a non-rotating circumferential collection container 48.

FIG. 6 illustrates a vacuum smelting process that can separate certain metals from asteroid feedstock. Some asteroid feedstocks are likely to contain high metal content. When the feedstock has been heated to a melted state, certain metals will separate from the surrounding minerals. On Earth when feedstock ores have been heated to a melted state in terrestrial gravity, the metals often sink to the bottom of the smelting container and may be drained off leaving behind a slag that may have little further terrestrial value. Simple smelting furnaces with gravity separation have been used since ancient times to extract lead, tin, copper, gold, and silver from rich ores.

In micro gravity manufacturing, rotating machinery and centrifugal forces can be used to replace gravitational forces. Referring to FIG. 6, concentrated solar energy passing through the enclosed light conduit 4 reflects from the mirror 5 and impinges upon the smelting vessel 40. The vessel 40 is affixed to the spinning platform 41 which is caused to rotate at various controlled speeds by the motor 42. As previously described, the axis of rotation shown by broken arrow 43 can be aligned perpendicular to the plane of the space factory orbit (and therefore parallel to the spins of other large rotating machinery in the factory) in order to avoid gyroscopic precession forces.

The vessel 40 has a rotationally balanced cylindrical symmetry with an oblate (bulging) equator. The smelting process begins when the vessel 40 is initially loaded with unconsolidated granular feedstock and is not rotating. After sufficient heating from solar energy, the feedstock melts. The motor 42 then drives the vessel 40 and the platform 41 to an initial low-speed rotation. In microgravity, the melt 44 will be forced to the inner walls of the vessel 40 and will slowly spread around the vessel 40 in a substantially continuous layer.

Once the melt 44 layer has settled into a substantially even thickness, the rotating structure will be relatively well mass-balanced. The motor 42 can then increase the rotation speed to a relatively high speed to generate centrifugal forces. The resulting strong centrifugal forces acting on the melt 44 will cause a differentiation of the minerals and metals in the melt. Denser material, such as liquid metals, will settle against the vessel wall near the oblate equator while less dense slag will migrate towards the central axis of rotation.

When the differentiation process has reached its limit, the drainage passages 45 can be unblocked by the hinged stopper plates 46a and 46b. For illustration purposes, FIG. 5 shows one passage 45 blocked and another unblocked. In actual operation, both (or all) drainage passages will be blocked during initial melting and spin up phases. When the drainage passages 45 are finally unblocked, molten metal under considerable centrifugal force will exit from vessel 40 in a rotating spray pattern 47. A non-rotating circumferential collection container 48 catches the spray of molten metal and cools it to solid form a solid metal circular band.

In another embodiment (not shown), the collection container 48 can rotate in synchrony with the vessel 40. In this embodiment, the spray pattern 47 of molten metals will collect in localized spots resulting in the growth of ingots of solidified metal.

Physical Vapor Deposition (PVD)

Aspects of this disclosure further relate to systems and techniques for using extracted materials in processes such as physical vapor deposition (PVD). In certain implementations, fractional distillation of solid mixtures into constituents are used in extending PVD processes for use in the environment of space. Aspects of this disclosure uses raw solar thermal power as an energy source as part of the design of PVD for the space environment. Certain implementations include thin-film inflatable solar reflectors and/or thin-film or foil inflatable forms in the shape of the structures to be fabricated, imaging and non-imaging optics, and high temperature crucibles.

As discussed herein, advantageous aspects of this disclosure relate to techniques for building a solar thermal powered factory in space to turn asteroids and lunar materials into massive space settlements, enabling millions of people to live and work in space. In particular, aspects of this disclosure solve certain challenges to large scale human settlements and industrialization of space.

Planetary surfaces neighboring the Earth are uninhabitable due to extreme temperature and toxic atmospheric conditions, reduced gravity, high radiation at the surface, and large gravity wells that make transportation too costly. For these and other reasons, one promising approach is to construct settlements in orbit that are purposefully engineered to be healthy, comfortable and productive environments for humans. Research showed that such settlements are scientifically feasible and can provide safe terrestrial-like environments for thousands and then millions of people to live and work in space.

One technical challenge, however, is making affordable orbital structures that mass in the millions of tons. Limited material availability and launch vehicle fairing capacity inhibit the scale and cost feasibility for sending the equipment and supplies from Earth needed to construct such habitats. One solution to this problem is to use in-space materials and manufacturing processes. For example, asteroids hold vastly more accessible raw minerals than the harvestable components of the Earth's crust. These small bodies contain enough material to build inhabitable megastructures with walls up to 7 meters thick and a total land area approximately 1,000 times that of the Earth.

Aspects of this disclosure address certain challenges on the path to human orbital settlements with an approach to process thousands of tons per year of asteroid material into engineered structures. In particular, aspects of this disclosure enable consumption of feedstocks from lunar or terrestrial origin to fabricate such structures.

Figure 7:
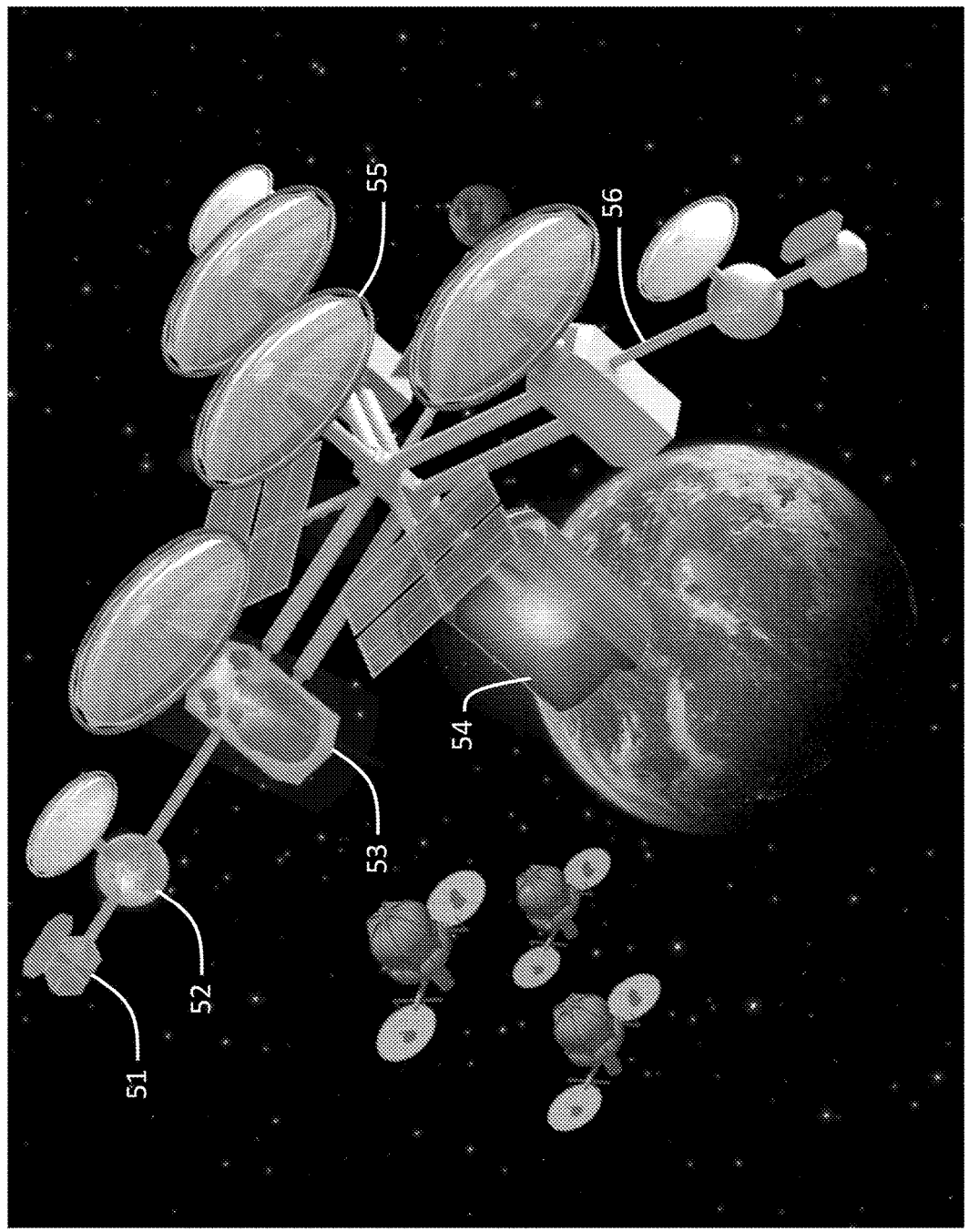
FIG. 7 illustrates an orbiting factory in space—e.g., for forming structures using vapor phase deposition (VPD).

FIG. 7 illustrates an orbiting factory in space including a storage container 51 for volatile materials condensed and processed in shielded low temperature stages, a plurality of condensers 52 for temperatures staged condensing of separate feedstocks, thin film inflatable solar concentrators 53 with secondary optical reflectors, a containment vessel 54 for heating feedstock to form structures using vapor phase deposition (VPD), and insulated conduits 55 for passively migrating vaporized asteroid feedstock.

Figure 8:
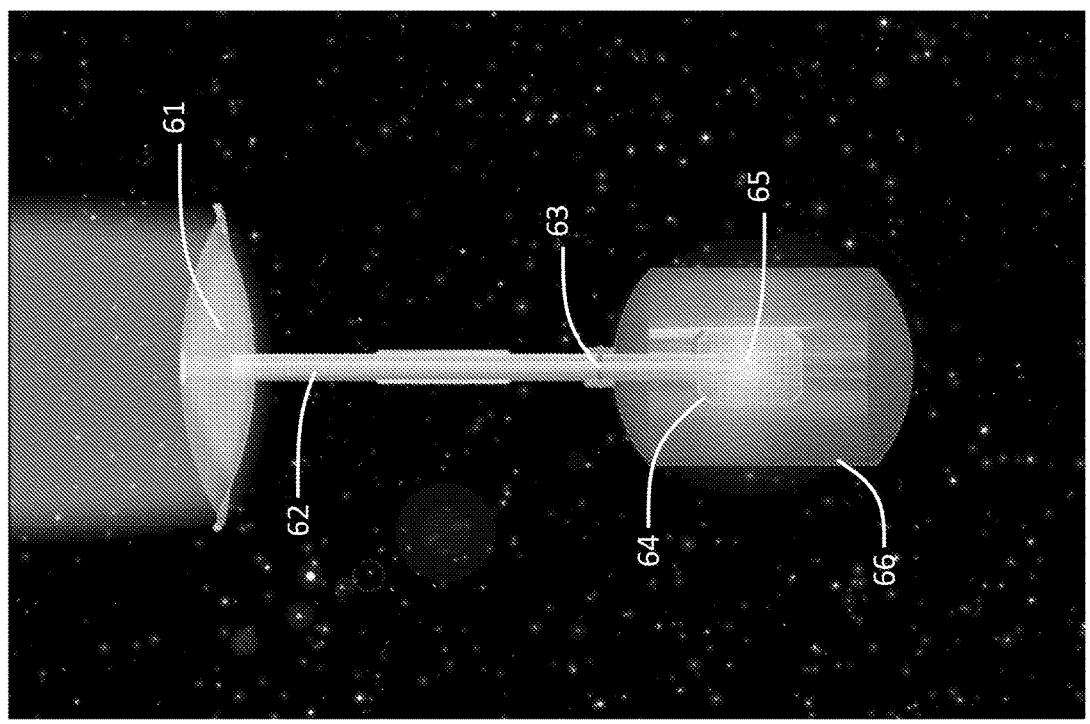
FIG. 8 illustrates a VPD system of the orbiting factory for forming structures using vapor phase deposition (VPD).

FIG. 8 illustrates a VPD orbiting factory including a thin-film inflatable solar concentrator 61, a light-tube 62 (a hollow tube with a reflective inner surface and transparent ceramic end window), a window 63 configured to keep vaporized feedstock trapped, a crucible 64 configured to hold an ingot of feedstock 65, and a thin-film or foil inflatable form 66 in the shape of the structure to be fabricated. In particular, FIG. 8 relates to a system that can implement a VPD process to fabricate large scale components.

The solar concentrator is configured to concentrate solar power to a high concentration ratio in order to vaporize the feedstock 65 within the crucible 64. Feedstock vapor passes through pores in the crucible 64 dimensioned to allow the vapor to pass through and deposits onto the walls of the inflatable form 66. Using VPD techniques powered by solar thermal energy, the system fully exploits the advantages of solar power, vacuum conditions, and micro-gravity environment to eliminate the challenges and costs associated with terrestrial fabrication and launch of hardware. This process can be used in the construction of structure elements, pressure vessels, storage containers, and habitats on orbital production facilities.

In some situations, before using raw materials in the VPD orbiting factory, the raw extraterrestrial materials can be advantageously separated into different useful materials. To achieve this separation, certain embodiments employ a multistage fractional distillation process as depicted in FIG. 9.

PVD can be used for a variety of applications on the Earth for applications such as coatings for wheels, pistons, medical equipment, and tools using a variety of heat sources, including electric arcs, electron beams, lasers and resistive heaters to vaporize the feedstocks. In space it makes more sense to use light-weight inflatable solar reflectors as the power source and to extend the process to thick-film deposition of structural elements. Selection of feedstock material depends on the purpose of the structure being made. Candidate materials for use in space include water, paraffins, polymers, and metals, with particular emphasis on magnesium. Magnesium is advantageous for this application because it is relatively common in asteroids, has high strength-to-mass ratio, and vaporizes at a modest 1363 K. Ignition issues with magnesium on the ground are not relevant or are easily managed in the space environment.

Physics laws dictate that the theoretical maximum temperature achievable by an ideal solar concentrator is the surface temperature of the Sun (5778 K). Ray trace analyses and ground tests with meter-class inflatable optics show that fabricated thin film reflectors produce peak temperatures of over 2800 K, enough to vaporize aluminum, magnesium, and other known asteroid constituents. Demonstrations using reflectors of lower quality show that concentration ratios of a few thousand to one are still high enough to directly ablate rock.

Figure 9:
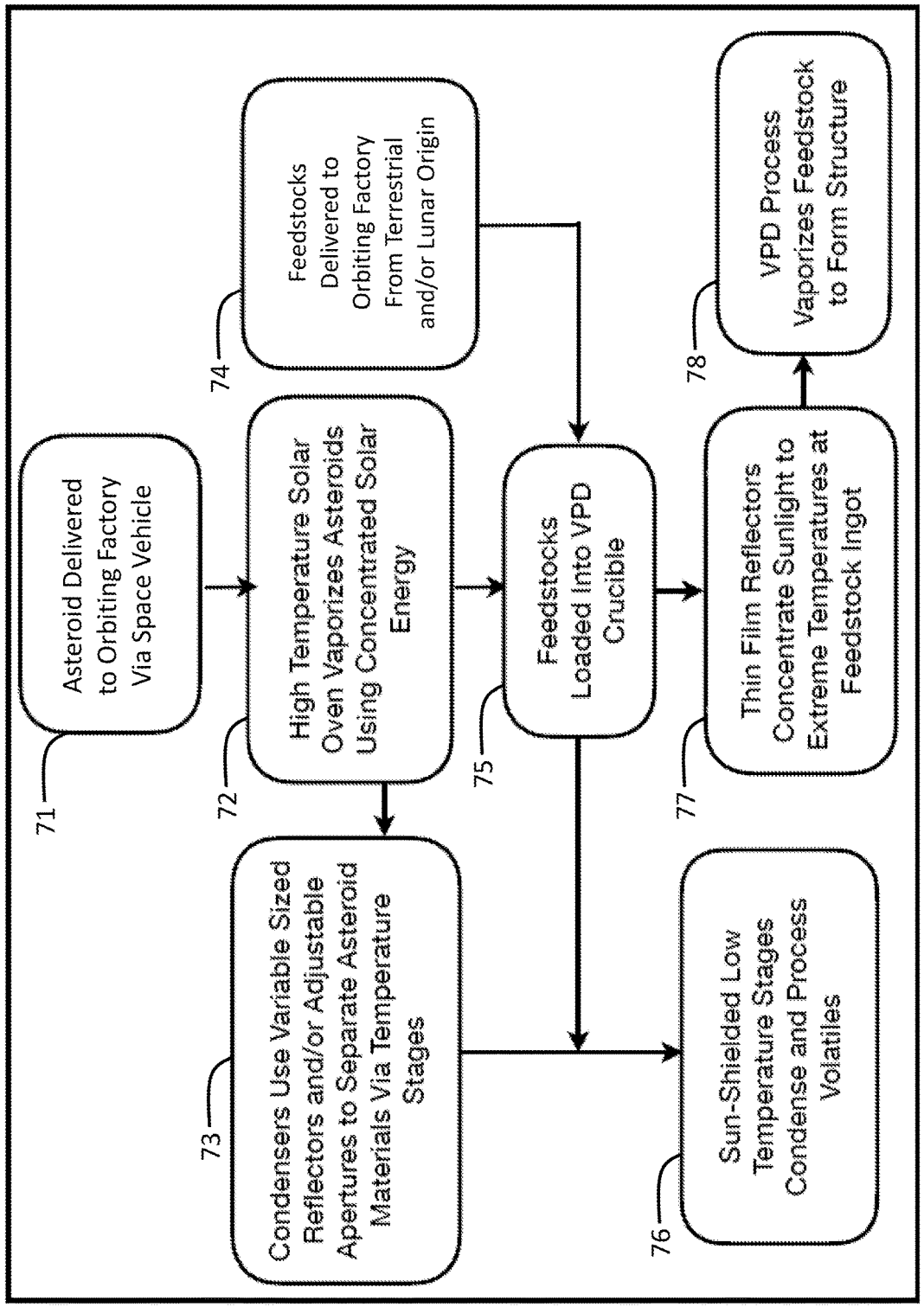
FIG. 9 illustrates an asteroid distillation process and feedstock utilization from asteroids, the moon, and the Earth.

FIG. 9 illustrates an asteroid distillation process and feedstock utilization from asteroids, the moon, and the Earth in accordance with aspects of this disclosure. In particular, the quad chart graphic of FIG. 9 shows how the orbiting factory can fractionally distill asteroids into their constituent materials to isolate feedstocks of different types.

At block 71, the orbiting factory receives an asteroid via a space vehicle. At block 72, a high temperature solar oven vaporizes asteroids using concentrated solar energy. At block 73, condensers (e.g., see condensers 52 of FIG. 7) use variable sized reflectors and/or adjustable apertures to separate asteroid materials via temperature stages. At block 74, the orbiting factory receives feedstocks from terrestrial and/or lunar origin. At block 75, feedstocks are loaded into a VPD crucible (e.g., the crucible 64 or FIG. 8). At block 76, sun-shielded low temperature stages condense and process volatiles. At block 77, thin film reflectors concentrate sunlight to extreme temperatures at the feedstock ingot (e.g., the ingot of feedstock 65 of FIG. 8). At block 78, the VPD process vaporizes the feedstock to form a structure.

In summary, a series of solar thermal ovens can each be passively controlled to a different temperature are connected by insulated hollow conduits to form temperature-staged condensers. Conduit and condensation surface temperatures can be controlled using passive thermal control methods to ensure that selected materials each deposit in a single oven. By circumventing the size limitations of build-plate AM, the orbiting factory enables fabrication of parts and large system elements that could not fit in a launch fairing faster than any conventional AM process. The orbiting factory can also enable on-orbit recycling and can evolve to support ISRU of orbital debris in Earth orbit and asteroid materials in cislunar space.

Advantageously, aspects of this disclosure relate to orbiting factories which can be used as a construction site in cislunar space capable of fabricating orbital stations and satellite worlds with virtually limitless dimensional constraints. In certain implementations, reflectors on the scale of hundreds of meters may be used, as this class of reflector may be capable of vaporizing metric tons of iron in the timeframe of days. The orbiting factories described herein can also be used for asteroid distillation, VPD technology, or both systems in a single factory.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description is not intended to be exhaustive or to limit the invention to the precise form disclosed above. While specific embodiments of, and examples are described above for illustrative purposes, various equivalent modifications are possible within the scope of the disclosed invention(s), as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be extracted, subdivided, and/or combined to provide further embodiments.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally. Thus, a remote device may include a device which is physically located in the same general area and connected via a device such as a switch or a local area network. In other situations, a remote device may also be located in a separate geographic area, such as, for example, in a different location, building, valley, and so forth.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. An orbiting factory in space, comprising:
a containment vessel configured to contain feedstock material obtained from an asteroid or lunar regolith;
one or more optical components configured to collect solar energy from the Sun, concentrate the collected solar energy to a power level sufficient to evaporate volatile gases and to cause spalling and fracturing of the feedstock material, and direct the concentrated solar energy to impinge upon a surface of the feedstock materials; and
a plurality of condensation chambers configured to receive the evaporated gasses and condense the evaporated gasses into liquid fractions, the condensation chambers further configured to rotate around an axis of rotation such that the liquid fractions are collected on inner surfaces of the condensation chambers.

2. The orbiting factory of claim 1, further comprising:
a structural frame,
wherein the one or more optical components comprise one or more collection mirrors rigidly affixed to the structural frame.

3. The orbiting factory of claim 2, further comprising:
one or more rotating structures configured to maneuver the orbiting factory to keep the one or more collection mirrors pointed at the distant Sun.

4. The orbiting factory of claim 2, further comprising:
an adjustable shutter configured to control an intensity of concentrated solar energy via partially or completely blocking an optical path of the concentrated solar energy.

5. The orbiting factory of claim 1, further comprising:
a plurality of rotating structures configured to be oriented with axes of rotation that are aligned perpendicularly to an orbital plane of the orbiting factory.

6. The orbiting factory of claim 1, wherein the one or more optical components are further configured to direct the concentrated solar energy to pass across a physical vacuum gap before entering the containment vessel.

7. The orbiting factory of claim 1, wherein two or more of the condensation chambers are interconnected and are controlled to maintain differing temperatures in order to separate solid, gaseous, and the liquid fractions, at least some of the liquid fractions being collected in different condensation vessels.

8. The orbiting factory of claim 1, wherein each of the condensation chambers comprises a plurality of internal metal plates spaced apart to increase surface area available within the condensation chambers for condensation of the liquid fractions, and wherein the internal metal plates in each of the condensations are arranged to be alternating and interleaved.

9. An orbiting factory in space, comprising:
a containment vessel configured to contain feedstock material obtained from an asteroid or lunar regolith;
one or more optical components configured to collect solar energy from the Sun, concentrate the collected solar energy to a power level sufficient to evaporate volatile gases and to cause spalling and fracturing of the feedstock material, and direct the concentrated solar energy to impinge upon a surface of the feedstock materials;
a plurality of condensation chambers configured to receive the evaporated gasses, the condensation chambers further configured to rotate around an axis of rotation, wherein a fraction of the spalled feedstock materials includes unconsolidated solid particles which are ground into a powder; and
a shaped container configured to compact the powder and sinter the compacted powder into shaped ceramics.

10. The orbiting factory of claim 9, wherein the one or more optical components are further configured to direct the concentrated solar energy to heat the powder to a defined range of temperatures in a preplanned and time-controlled sequence, and wherein the one or more optical components comprise an adjustable shutter in an optical path of the concentrated solar energy configured to control the heating of the powders, the orbiting factory further comprising:
a vice configured to apply a uniaxial pressure to the powder in the shaped container.

11. The orbiting factory of claim 9, wherein the shaped ceramics comprise tile-shaped ceramics configured to be employed as sacrificial heat shields for reentry vehicles.

12. The orbiting factory of claim 9, wherein the shaped ceramics comprise block-shaped ceramics configured to be employed in constructing protective radiation shields for human habitats.

13. An orbiting factory in space, comprising:
a containment vessel configured to contain feedstock material obtained from an asteroid or lunar regolith;
one or more optical components configured to collect solar energy from the Sun, concentrate the collected solar energy to a power level sufficient to evaporate volatile gases and to cause spalling and fracturing of the feedstock material, and direct the concentrated solar energy to impinge upon a surface of the feedstock materials;
a plurality of condensation chambers configured to receive the evaporated gasses, the condensation chambers further configured to rotate around an axis of rotation, wherein a fraction of the spalled feedstock materials includes unconsolidated solid particles;
a refractory container configured to receive the solid particles in a vacuum environment, wherein the one or more optical components are further configured to direct the concentrated solar energy to head the refractory container to a temperature sufficient to melt the solid particles; and
a piston configured to apply a pressure to the melt to extrude the melt through a shaped orifice in the refractory container.

14. The orbiting factory of claim 13, wherein the orifice is shaped to produce extrusions of useful engineering shapes including one or more of: round rods, flat sided rods of three or more sides, I-beams, T-beams, U-channels, and rods with curved cross sections.

15. The orbiting factory of claim 13, further comprising:
one or more chambers configured to anneal the extrusions for a period of time by holding the extrusions at temperatures below the melting and softening temperature of the extrusions in order to reduce brittleness.

16. The orbiting factory of claim 13, wherein the orifice comprises one or more orifices, each having a diameter of less than 1 millimeter configured to produce one or more small diameter extrusions.

17. The orbiting factory of claim 16, further comprising:
a rotating heated drum configured to collect the one or more extrusions, wherein the drum is configured to be heated to a temperature sufficient to anneal the extrusions over a period of time, thereby reducing the brittleness and increasing the flexibility of the extrusions.

18. The orbiting factory of claim 17, wherein the drum is further configured to rotate at a speed controlled to stretch the extrusions into smaller diameter fibers before the fibers are collected on the rotating drum.

19. The orbiting factory of claim 18, wherein the fibers are configured to be removed from the drum, twisted together in a textile spinning method, and further combined into larger cords or cables or nets or fabrics.

20. An orbiting factory in space, comprising:
a containment vessel configured to contain feedstock material obtained from an asteroid or lunar regolith;
one or more optical components configured to collect solar energy from the Sun, concentrate the collected solar energy to a power level sufficient to evaporate volatile gases and to cause spalling and fracturing of the feedstock material, and direct the concentrated solar energy to impinge upon a surface of the feedstock materials;
a plurality of condensation chambers configured to receive the evaporated gasses, the condensation chambers further configured to rotate around an axis of rotation;
a crucible configured to hold processed feedstock; and
a form enclosing the crucible and having a shape of a structure to be fabricated.

21. The orbiting factory of claim 20, wherein the one or more optical components are further configured to direct the concentrated solar energy to the processed feedstock to vaporize the processed feedstock.

22. The orbiting factory of claim 20, wherein the crucible comprise pores dimensioned to allow the vaporized feedstock to pass through the pores and deposit onto walls of the form.

* * * * *